(12) United States Patent
Majid et al.

(10) Patent No.: US 12,395,459 B2
(45) Date of Patent: Aug. 19, 2025

(54) LOGIC INJECTION IN MESSAGING STATE MACHINES

(71) Applicant: MESSAGEBIRD BIDCO B.V., Amsterdam (NL)

(72) Inventors: Dana Majid, Amsterdam (NL); Robert Vis, Amsterdam (NL)

(73) Assignee: MessageBird BidCo B.V., Amsterdam (NL)

( * ) Notice: Subject to any disclaimer, the term of this patent is extended or adjusted under 35 U.S.C. 154(b) by 140 days.

(21) Appl. No.: 18/458,492

(22) Filed: Aug. 30, 2023

(65) Prior Publication Data

US 2024/0073175 A1   Feb. 29, 2024

Related U.S. Application Data

(60) Provisional application No. 63/402,771, filed on Aug. 31, 2022.

(51) Int. Cl.
*H04L 51/23*    (2022.01)
*H04L 51/222*   (2022.01)
*H04L 67/02*    (2022.01)

(52) U.S. Cl.
CPC ............ *H04L 51/23* (2022.05); *H04L 51/222* (2022.05); *H04L 67/02* (2013.01)

(58) Field of Classification Search
CPC ....... G06Q 10/10; H04L 51/23; H04L 51/222; H04L 67/02; H04L 51/234; H04L 51/214; H04L 51/56
See application file for complete search history.

(56) References Cited

U.S. PATENT DOCUMENTS

2005/0198148 A1   9/2005   Cabrera et al.
2006/0182131 A1   8/2006   Dziekan, Jr.
(Continued)

FOREIGN PATENT DOCUMENTS

JP   5073812 B2       11/2012
WO   2017211141 A1    12/2017

OTHER PUBLICATIONS

Anonymous, Communication and search report in European patent application EP23194628.6, dated Feb. 1, 2024, 9 pages, pub. by European Patent Office, Munich, Germany.

*Primary Examiner* — Caroline H Jahnige
(74) *Attorney, Agent, or Firm* — Baker Botts L.L.P.

(57) ABSTRACT

A computer-implemented method, comprising using a message application processor, receiving a first request from a separate application server computer executing a particular computer program application to create and cause sending a digital electronic mess age; in response to the request, the message application processor creating the message and assigning a status value to the message, the status value being associated with a first state of the message; the message application processor causing the message to transition to a subsequent state; the message application processor performing a flow hook lookup to determine whether a flow definition is associated with the transition from the first state to the subsequent state and with the particular computer program application, and in response thereto, evaluating the flow definition based on the message to result in executing an operation specified in the flow definition using one or more of a payload of the message, the status value, or a channel identifier of the message; the message application processor selecting, based on the channel identifier, a particular communication channel among a plurality of different communication channels, and transmitting a (Continued)

request to the particular communication channel to transmit the message using the particular communication channel.

18 Claims, 5 Drawing Sheets

(56) References Cited

U.S. PATENT DOCUMENTS

| | | |
|---|---|---|
| 2008/0205444 A1 | 8/2008 | Campbell et al. |
| 2008/0294735 A1* | 11/2008 | Muntermann ........ H04L 51/214 |
| | | 709/206 |
| 2010/0169424 A1* | 7/2010 | Gustafsson ............. H04L 51/56 |
| | | 709/206 |
| 2017/0272504 A1* | 9/2017 | Cahill ..................... G06F 16/22 |
| 2018/0097756 A1* | 4/2018 | Lew ........................ G06Q 30/01 |
| 2019/0356580 A1 | 11/2019 | Licardie et al. |
| 2021/0021649 A1 | 1/2021 | Rathod |

* cited by examiner

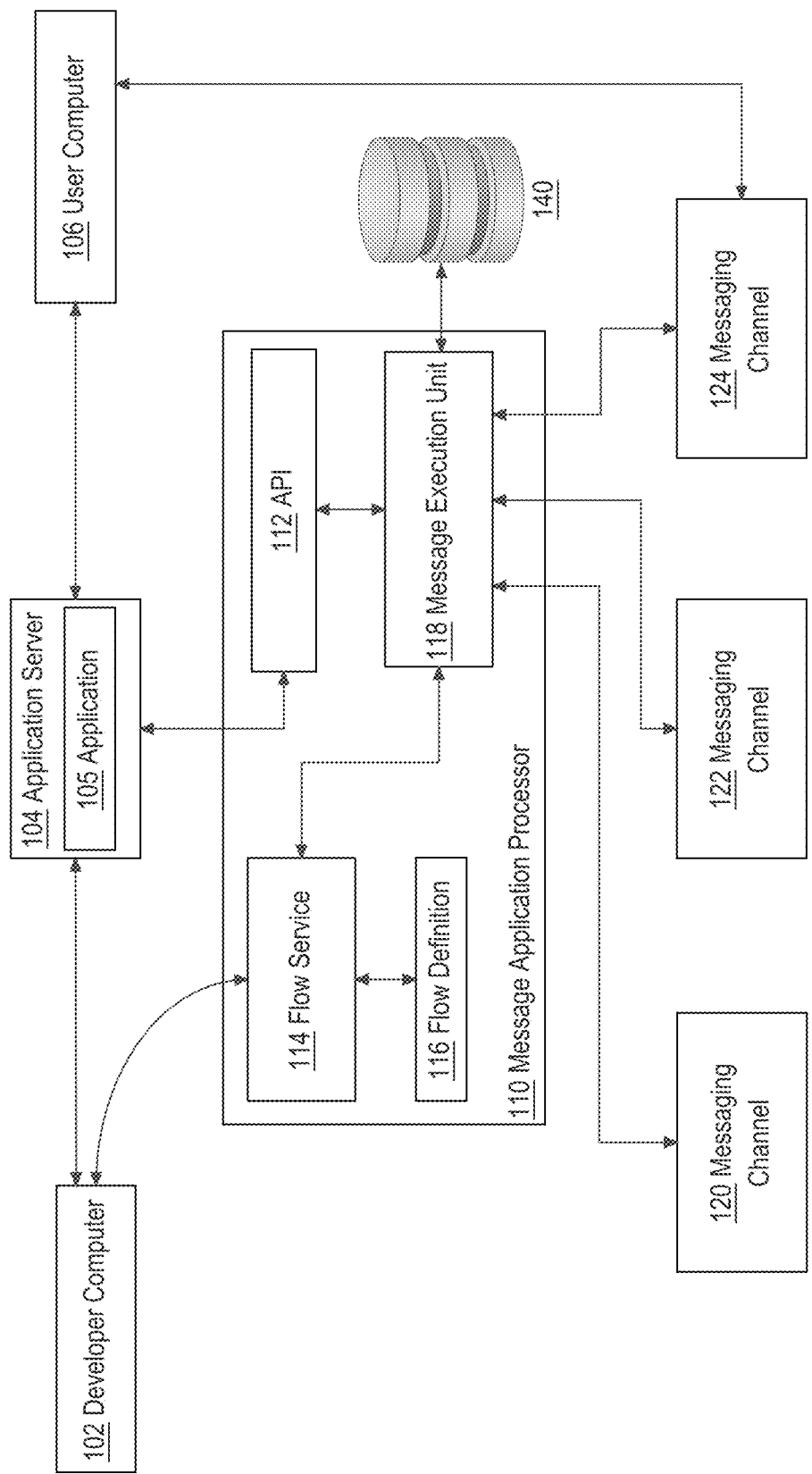

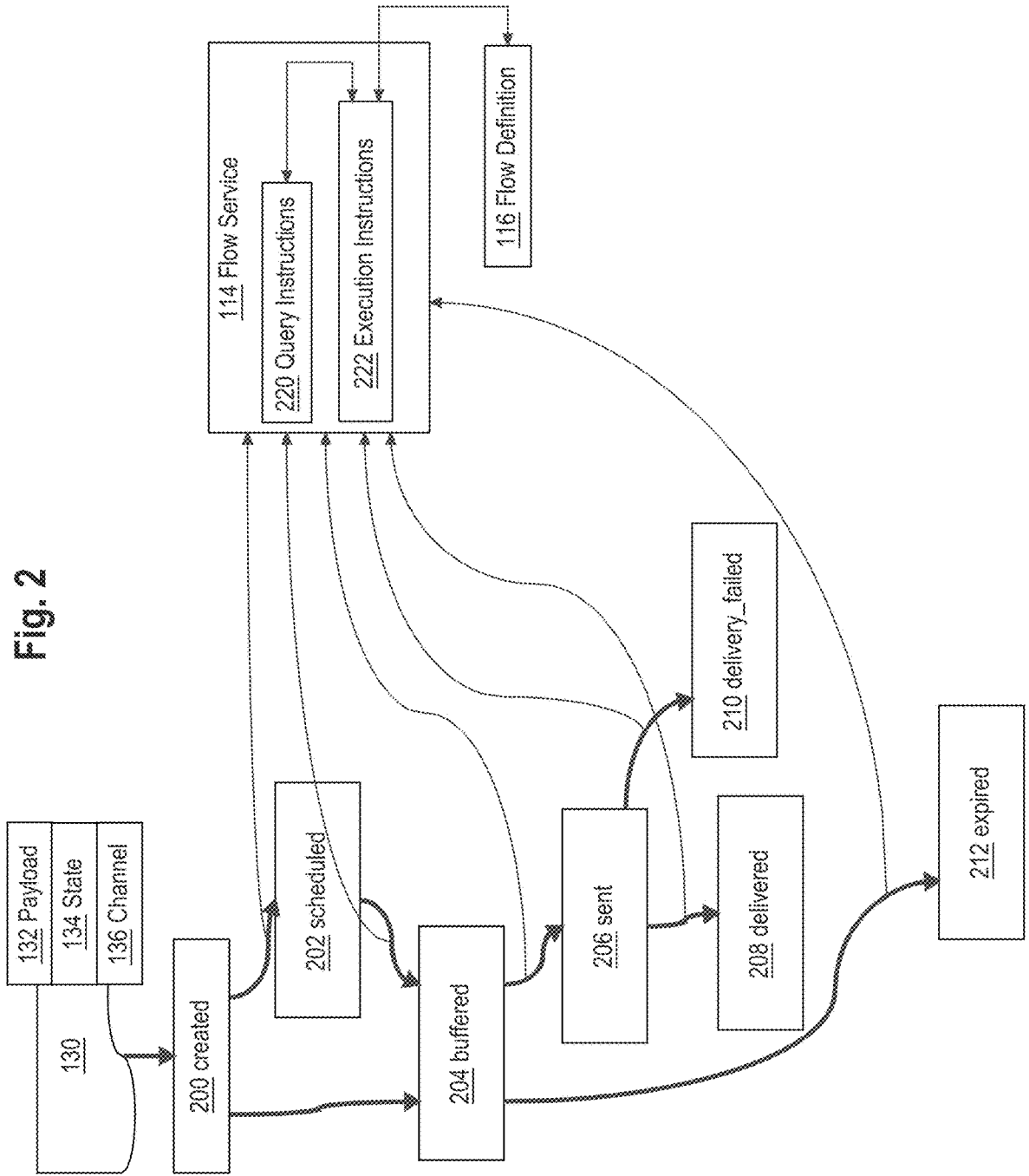

LOGIC INJECTION IN MESSAGING STATE MACHINES

BENEFIT CLAIM

This application claims the benefit under 35 U.S.C. 119(e) of provisional application 63/402,771, filed 31 Aug. 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2023 MessageBird.

TECHNICAL FIELD

One technical field of the present disclosure is large-scale distributed computer systems that are programmed to operate as short message transmission systems. Another technical field is the application of state machines to computer software development.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large-scale distributed computer systems have entered wide use to support the transmission of short text messages, instant message services, verification messages, and other applications. With these systems, enterprises can define flows of messages via Short Message Service (SMS), MMS, WHATSAPP, other instant messengers, and other communication channels such as chat services. Flows can specify conversations across multiple different communication channels, verification via two-factor authentication, or other services or applications. The core operating software of the messaging systems, which implement state machines to define transitions from one message state or status to another, can facilitate large numbers of flows for many enterprises at once.

These systems and their core operating software offer tremendous flexibility and scalability. However, supporting the transmission of billions of messages, individual enterprises may desire to implement applications or flows that are not generally applicable to others. Therefore, the owners and operators of messaging infrastructure systems cannot efficiently develop these flows for the enterprises, and greater scale and efficiency can be realized when enterprises define the flows themselves. However, existing large-scale messaging systems have not provided convenient or simple means for enterprises and non-technical personnel to define how to modify or use core messaging state machines for particularized applications. There is a long-standing, unmet need in the field for improved ways of introducing custom processing logic to general-purpose messaging state machines.

SUMMARY

The appended claims may serve as a summary of the invention.

BRIEF DESCRIPTION OF THE DRAWINGS

In the drawings:

FIG. 1A illustrates a distributed computer system showing the context of use and principal functional elements with which one embodiment could be implemented.

FIG. 2 illustrates data flow relationships between a plurality of different message status values and a flow service that evaluates a flow definition.

DETAILED DESCRIPTION

Figure 4:
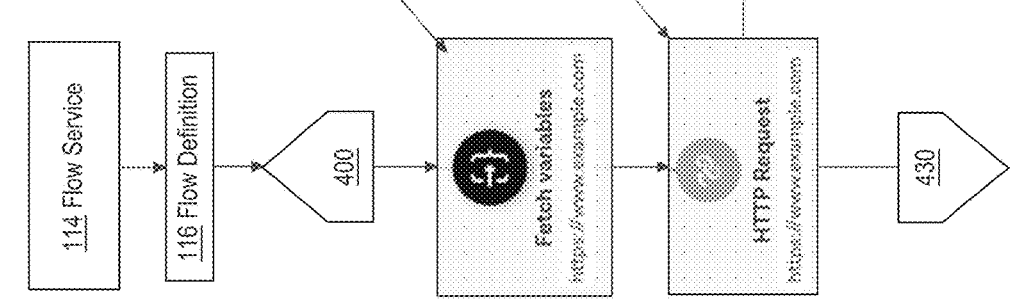
FIG. 4 illustrates an example visual flow definition process, in one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:
  1. General Overview
  2. Structural & Functional Overview
  3. Implementation Example—Hardware Overview 1. General Overview A distributed computer system implements a large-scale message processing system that can initiate, request sending, and monitor the transmission of messages using any of a plurality of different communication channels that are independent of the system. Different users, entities, or enterprises, including those having a customer relationship with an owner or operator of the message processing system, operate independent applications that can call the message processing system to request the system to originate or publish messages on any one or more of the channels. Each message is associated with a status value, and message processing is defined according to a state machine having states and transitions. The different users, entities, or enterprises also can define application-specific, customer-specific flows, each flow being associated with one or more state transitions. Each flow can comprise rules or programmed logic, and can include calls to outside services such as customer relationship management (CRM) systems, marketing automation systems, customer support systems, private databases, collaborative productivity applications, and issue tracking systems.

At runtime, the applications call the message processing system to originate messages, which transition between states as message scheduling, sending, delivery, or exceptions occur. Specific message status, in one embodiment, can include accepted, processing, sent, sending_failed, delivered, delivery_failed, and deleted. As a message transitions between states, a message publisher or originator of the message processing system acting on behalf of the applications can detect the transitions, determine based upon context data whether to look up and use a flow definition for a particular transition, and invoke a flow service to evaluate the flow definition with the message. The flow service evaluates the flow definition over the message and its metadata, resulting in a transformation of a payload, status, or channel of the message. The flow service responds to the message publisher or originator, which can return a response to the application. Flow invocation can occur at any state transition or status, and logic in a flow can be arbitrarily complex.

For purposes of illustrating a clear example, certain sections of this disclosure use terminology and describe processes that are specific to SMS messaging. However, other embodiments may implement voice calling, voice messaging, email transfer, and messaging using applications, apps, or platforms other than SMS, through similar calls, objects, formats, processes, and operations.

In various embodiments, the disclosure encompasses the subject matter of the following numbered clauses:

1. A computer-implemented method, comprising using a message application processor, receiving a first request from a separate application server computer executing a particular computer program application to create and cause sending a digital electronic message; in response to the request, the message application processor creating the message and assigning a status value to the message, the status value being associated with a first state of the message; the message application processor causing the message to transition to a subsequent state; the message application processor performing a flow hook lookup to determine whether a flow definition is associated with the transition from the first state to the subsequent state and with the particular computer program application, and in response thereto, evaluating the flow definition based on the message to result in executing an operation specified in the flow definition using one or more of a payload of the message, the status value, or a channel identifier of the message. Channel identifiers can include, in one embodiment, identifiers of channels like mobile station integrated services digital network (MSISDN) identifiers, email addresses, or others. The message application processor then is programmed to select, based on the channel identifier, a particular communication channel among a plurality of different communication channels, and transmit a request to the particular communication channel to transmit the message using the particular communication channel.

2. The method of clause 1, the operation in the flow definition specifying a transformation of the message from a first payload value to a second payload value.

3. The method of clause 1, the operation in the flow definition specifying a transformation of the status value to a third state.

4. The method of clause 1, the operation in the flow definition specifying a transformation of the channel identifier to specify a different particular communication channel among the plurality of different communication channels.

5. The method of clause 1, the operation in the flow definition specifying a fetch of a plurality of data values from a specified network location, the method further comprising, in response to executing the fetch, storing the plurality of data values in a corresponding plurality of program variables in a main memory of the message application processor.

6. The method of clause 1, the operation in the flow definition specifying an HTTP request to a specified network location.

7. The method of clause 1, the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER, APPLE BUSINESS CHAT, INSTAGRAM DIRECT, TIKTOK, EMAIL, ZALO, GOOGLE BUSINESS MESSAGING, LINE, TWITTER.

8. The method of clause 1, the first state and the subsequent state comprising two states among a plurality of different possible states of a state machine that the message application processor implements to process the message.

9. The method of clause 8, the different possible states comprising: created, scheduled, buffered, sent, delivered, delivery failure, or expired.

10. The method of clause 8, the operation in the flow definition specifying a plurality of machine executable script code instructions.

2. Structural & Functional Overview 2.1 Message Application Processor and Environment FIG. 1A illustrates a distributed computer system showing the context of use and principal functional elements with which one embodiment could be implemented. In an embodiment, a computer system of FIG. 1A comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1A, a developer computer 102 is communicatively coupled, directly or indirectly via one or more networks or network links, to an application server 104, which is also coupled to a message application processor 110 and to a user computer 106. The message application processor 110 is coupled to a plurality of different messaging channels 120, 122, 124. Lines and arrows joining the developer computer 102, application server 104, message application processor 110, user computer 106, and messaging channels 120, 122, 124 broadly represent any combination of one or more local area networks, wide area networks, campus networks, or internetworks, using any of terrestrial or satellite links and/or wired or wireless network links.

Generally, in this arrangement, developer computer 102 is associated with a developer, owner, or operator of an interactive, online computer program application 105 that application server 104 executes. The developer computer 102 provides programming, configuration, testing, and maintenance concerning one or more applications 105 that execute at application server 104. User computer 106 interacts with the application server 104 to obtain a substantive service, such as a merchant service, online shopping service, financial service, entertainment or game service, educational service, or any other substantive application. Application server 104 can implement or host an HTTP server to facilitate delivering dynamic HTML applications to clients such as user computer 106 and to accomplish parameterized HTTP GET and POST calls to message application processor 110. Application server 104 can implement an SMS handler for inbound (received) SMS messages using the POST HTTP method. Message application processor 110 originates messages to the user computer 106 via messaging channels 120, 122, 124, on behalf of the application server 104 and its applications 105.

Figure 5:
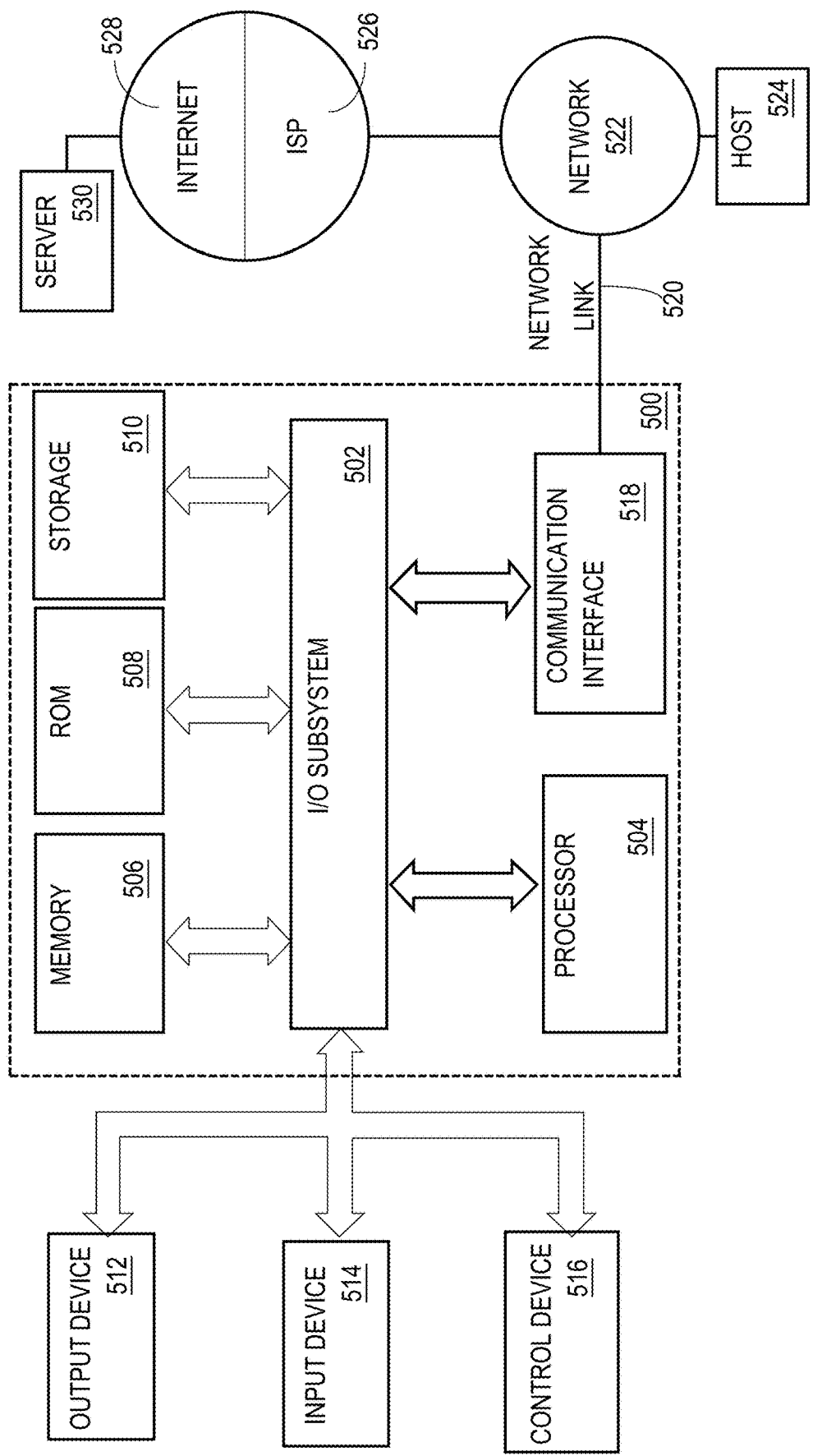
FIG. 5 illustrates a computer system with which one embodiment could be implemented.

Each of the developer computer 102 and user computer 106 can have the structure shown for a general-purpose computer in FIG. 5 and can be any of a laptop computer, desktop computer, workstation, or mobile computing device, in various embodiments. Application server 104 and/or message application processor 110 can be implemented using one or more server computers, processor clusters, and/or virtual computing instances in any one or more of an enterprise data room, private data center, or public data center such as a cloud computing facility. Typically, the application server 104 and message application processor 110 are implemented using flexible cloud computing services with which processors, memory, and storage with different numbers, sizes, or capacities can be instantiated based on processing demand or number of clients.

The messaging channels 120, 122, 124 represent message networks, applications, or services, and typically are independent of the message application processor 110. "Channel," in this context, refers broadly to a message service provider, all its independent infrastructure, and its software applications, application programming interfaces, and related services. Examples of channels include, as of this writing: SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER. The messaging channels 120, 122, 124 also can represent a mail transfer agent (MTA) integrated into the message application processor 110 or external, for sending electronic mail (email). The messaging channels 120, 122, 124 also can include any message service, system, software, application, or app that is functionally equivalent to one or more of the foregoing and developed after the time of this writing.

In one embodiment, message application processor 110 comprises an application programming interface (API) 112, flow service 114, and message execution unit 118. Each of the API 112, flow service 114, and message execution unit 118 can be implemented using one or more sequences of computer program instructions, methods, functions, objects, or other units of program instructions. API 112 can be implemented as a Representational State Transfer (REST) API having a set of function calls that can be invoked programmatically from an application executing at application server 104. For example, application 105 can format and transmit an HTTP GET or POST request specifying API 112 as an endpoint and having a parameterized payload that identifies a particular API call and values for use in processing the call. When creating a message is requested, the API automatically assigns a unique random identifier value so that applications can always check the status of the message using the API and the ID. API 112 can be integrated with an HTTP server and can be programmed to return an HTTP response to each API call that includes a payload with responsive values. API 112 can implement security controls based on access keys for authorization; for example, an owner or operator of the message application processor 110 securely generates an API key for the particular application 105 of the owner or operator of the application server and/or developer computer 102 and provides the API key to the developer computer. Application 105 is programmed to present the API key to the API 112 with each API call to authenticate the call and, as described in other sections, to enable associating flow definitions 116 with message state or status transitions for messages that are associated with the application. Requests and response payloads can be formatted as JSON using UTF-8 encoding and URL-encoded values.

Flow service 114 can be programmed to implement flow definition or authoring functions, and flow evaluation functions. In an embodiment, developer computer 102 can establish a connection to the flow service 114 for the purpose of authoring or defining a flow definition 116 (also termed a "flow") that defines one or more message states or state transitions with different status values, and one or more instructions, calls, or other logic to be executed for messages having a particular state or state transition. In an embodiment, flow service 114 implements a visual, graphical user interface by which flows can be defined visually using a pointing device of the developer computer 102 to move or place graphical objects representing status values, states, transitions, calls, or services.

Message execution unit 118 represents instructions that implement core message processing functions of the message application processor 110 such as message publishing services, interfaces to messaging channels 120, 122, 124, exception handling, and analytical reports. Message execution unit 118 can be programmed to create, read, update, or delete messages, message metadata, and control metadata in a database 140, which can be implemented using any of relational databases, no-SQL databases, object stores, or other data repositories. The programming and operation of message execution unit 118 are described further in other sections herein. A commercial embodiment of message application processor 110 is the MESSAGEBIRD message processing system of MessageBird, Amsterdam, Netherlands.

Figure 1B:
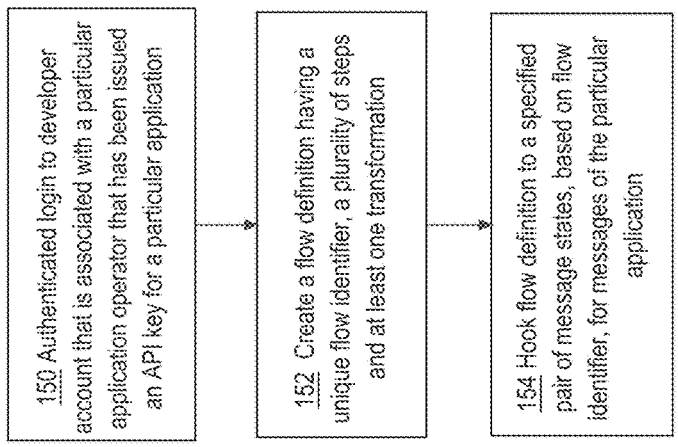
FIG. 1B illustrates a process of creating a flow definition.

FIG. 1B illustrates a process of creating a flow definition. In one embodiment, at step 150, an authenticated login occurs to a developer account that is associated with a particular application operator that has been issued an API key for a particular application. For example, developer computer 102 completes an authenticated login to the flow service 114, using developer credentials that have been previously associated, in database 140 or another credentials store, with the owner or operator of the application server 104 and/or the API key previously issued for the application 105. The particular mechanics of credential creation, issuance, and storage are not critical, provided that the message application processor 110 can associate each flow definition 116 that the developer computer 102, or a developer account, creates with the particular application 105 and its API key.

At block 152, a flow definition is created having a unique flow identifier, a plurality of steps, and at least one transformation. In some embodiment, creating a flow definition comprises the developer computer 102 providing input to a visual flow design application of the flow service 114 and selecting a flow creation function. In response, the flow service 114 automatically creates a flow definition 116 in the database 140 and assigns a unique flow identifier to the flow definition, which is stored in the database record. In some embodiments, the flow identifier can be algorithmically or cryptographically based upon the API key of the application 105, or the record of the flow definition 116 in the database 140 can include a reference to the application 105 or credentials that can be used to generate or validate the API key of the application 105. The specific mechanism and data values stored in this process are not critical provided that the flow service 114 can establish a binding of the flow definition 116 to the particular application 105 so that the flow definition can be invoked only at specified state transitions of messages that the particular application originated or manages. The steps and transformation of the flow definition 116 can be created and specified as further described in other sections for FIG. 4.

At block 154, the flow definition is hooked to a specified pair of message status values, based on the flow identifier, for messages of the particular application. In an embodiment, block 154 involves the developer computer 102 providing input to identify the particular application 105, and to select a particular pair of message states from among the available message status values. Examples of message status values can include, in one embodiment, accepted, processing, sent, sending_failed, delivered, delivery_failed, and deleted, or as described in the next section for FIG. 2. The flow service 114 can implement a graphical user interface with widgets by which the developer computer can select pairs of available or defined message states. In response to a SAVE selection, or similar function, the flow service 114 can be programmed to persistently store a flow hook with identifiers of the specified pair of message states and a reference to the database record for the flow definition 116. In some embodiments, a fast, in-memory hook lookup table is maintained in the main memory of message application processor 110 that maps pairs of available message status values or transitions to flow identifiers. Flow definitions 116 can be indexed by flow identifiers and stored in a fast-access database. Collectively, the hook lookup table and flow definition storage should support wire-speed lookup, retrieval, and evaluation of flow definitions as high-speed messages are managed by the message application processor 110 at a large scale.

Figure 3:
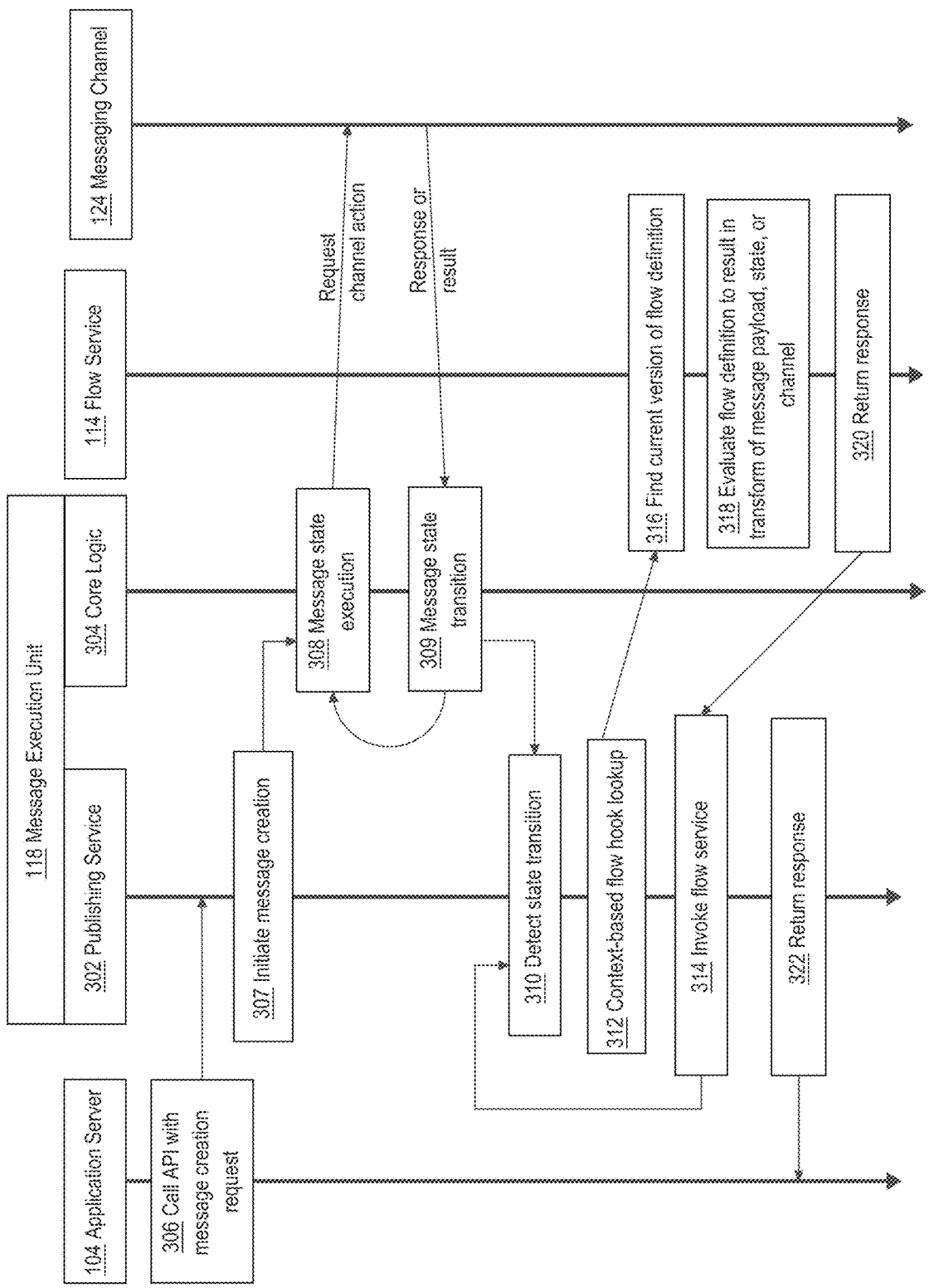
FIG. 3 illustrates an example process flow that can be programmed to implement the injection of code logic into message status transitions in a message processing system.

FIG. 1B represents a preparatory state for creating flow definitions 116, storing records, and joining flow definitions to message transitions for access and invocation later. FIG. 2, FIG. 3 will focus on runtime aspects of processing flow definitions 116.

2.2 Message States and Flow Processing

FIG. 2 illustrates data flow relationships between a plurality of different message status values and a flow service that evaluates a flow definition. FIG. 2 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

In an embodiment, as detailed in other sections, the operation of the message execution unit 118 in response to calls from application server 104 results in creating one or more messages 130. Each message 130 comprises a digital object or data structure that is digitally stored in the main memory of the message application processor 110 and can be transiently stored in database 140. Each message 130 comprises a plurality of digitally stored attribute values including but not limited to a payload 132, status 134, and channel 136; the payload may be termed a body and can comprise a plurality of other values, and the channel may be an identifier of one of the channels 120, 122, 124. A message object, in one embodiment, can comprise a message object identifier; a reference such as a URL of the object; a direction value specifying sent or received; a type value specifying SMS, binary, flash, etc.; an originator identifier; reference value; a reporting URL for status reporting; a validity value specifying a period of message validity; a gateway route identifier; a string payload; a message class value; a scheduled date/time value; a created date/time value; a hashmap of recipient information. In an embodiment, the recipient information can comprise an array specifying a count, status values, and items for each of a plurality of recipients.

Status values can correspond to state values. In an embodiment, the message 130 progresses through two or more states as shown in FIG. 2, and states can include but are not limited to a created state 200, scheduled state 202, buffered state 204, sent state 206, delivered state 208, delivery failed state 210, and expired state 212. Other embodiments can define more or fewer states and status values.

In some embodiments, each of the states of FIG. 2 also is associated, in message 130, with a status reason, value, or code that can specify details about the message status. In one embodiment, values of the status reason or code can include: successfully delivered, pending delivery report or receipt (DLR), DLR not received, unknown subscriber, unavailable subscriber, expired, opted out, received network error, insufficient balance, carrier rejected, capacity limit reached and generic delivery failure.

In an embodiment, at any of the created state 200, scheduled state 202, buffered state 204, sent state 206, delivered state 208, delivery failed state 210, and expired state 212, or at a state transition, the flow service 114 can be invoked under control of the message originator. In some embodiments, the flow service 114 implements a hook management API, which the developer computer 102 can use to create a hook between two states and to reference a particular flow definition 116 to run based on its flow identifier. In FIG. 2, arrows that link one state to another state represent state transitions, and arrows linking the flow service 114 to other arrows represent hooks to state transitions.

In an embodiment, flow service 114 is programmed with query instructions 220 and execution instructions 222. The query instructions 220 are programmed to determine whether a flow definition 116 is stored in the database 140 or in memory or otherwise available based upon a then-current context of message 130 and the particular state or transition that occurred. If a flow definition 116 exists that matches the current context, then the flow definition is accessed or retrieved and evaluated, using execution instructions 222, based on the message 130, payload 132, state 134, channel 136, and other attributes of the message. Thus, in an embodiment, each of the states 200 to 212, inclusive, is capable of triggering an invocation of the flow service 114 and evaluation of a flow definition 116 to execute or use rules or programmed logic of the flow definition to act on the message 130 or to call an external service.

FIG. 3 illustrates an example process flow that can be programmed to implement the injection of code logic into message state transitions in a message processing system. FIG. 3 shows a progression of operations that advance in time from top to bottom of FIG. 3, showing actions taken respectively by application server 104, message execution unit 118 of message application processor 110, and messaging channel 124.

In some embodiments, the functional execution of message execution unit 118 can be divided among a publishing service 302 and core logic 304, which can represent functionally independent sets of instructions within the message application processor 110. In this example, the publishing service 302 is responsible for initiating message creation, initiating flow hook lookups, and other interfacing between the application server 104, the core logic 304, and the flow service 114. However, in other embodiments, any service of the message application processor 110 can act in the same manner as the publishing service 302, such as a conversations service, voice call service, or voice messaging service. Each service can execute an independent evaluation of the hook lookup and evaluation functions.

FIG. 3 shows a process flow that initiates by using a message application processor for receiving a first request from a separate application server computer executing a particular computer program application to create and cause sending a digital electronic message. In an embodiment, as shown at operation 306, application server 104 executes a host application which, in the ordinary course of execution, calls the API 112 of message application processor 110 and provides a message creation request. The call of operation 306 could occur at any step in the execution of the host application at which a message processing function is required or useful. The particular position of the call in a logical flow of the application will vary based upon the particular application that the application server 104 hosts or runs.

In response to the call of operation 306, API 112 can be programmed to signal message execution unit 118 that a call has been received specifying creating a message. In further response, the message execution unit 118 can programmatically call the publishing service 302 to process the request. FIG. 3 can continue with, in response to the request, the message application processor creating the message and assigning a status value to the message, the status value being associated with a first state or status value of the message. The publishing service 302 then initiates creating a message, at operation 307. The publishing service 302 can represent or include an originator process or agent or thread that the publishing service instantiates or creates for each application server 104, application, or user session.

Assume that a message object like message 130 (FIG. 2) is created in memory and the status value of the message object is set to the created state 200 and then the buffered state 204. At block 308, the core logic 304 executes instructions associated with the buffered state 204 and requests the messaging channel 124 to dispatch the message. Depending on the configuration and operation of the messaging channel 124, at some later time, a response or result is transmitted back to the core logic 304, resulting in a message state transition at block 309. Thus, FIG. 3 comprises the message application processor causing the message to transition to a subsequent state corresponding to a different status value. In some embodiments, message application processor 110 implements a distributed state machine in which multiple different back-end services are programmed to assign states or status values to a message depending on the then-current logical position of the message in a message flow or life-cycle, and therefore FIG. 3 represents a simplified view of state assignment. Importantly, the message application processor 110 implements the state machine, rather than the application server 104 or an application that it hosts.

At block 310, the publishing service 302 detects the message state transition at block 309. In one embodiment, to detect message state transitions, the publishing service 302 subscribes to an event bus on which the core logic 304 publishes all message state transitions. This approach places the processing burden of handling a large number of messages and message state transitions on the message originator, such as publishing service 302 or its threads or agents, rather than on the core logic 304, thereby enabling the message originator to use context data to determine what action to take when a particular state transition occurs.

FIG. 3 can continue with the message application processor performing a flow hook lookup to determine whether a flow definition is associated with the transition from the first state to the subsequent state and with the particular computer program application, and in response thereto, evaluating the flow definition based on the message to result in executing an operation specified in the flow definition using one or more of a payload of the message, the status value, or a channel identifier of the message. In an embodiment, at block 312, the publishing service 302 conducts a context-based flow hook lookup. Block 312 is programmed for the publishing service 302 to determine, from main memory or persistent storage such as database 140, whether a flow definition 116 exists given the then-current context of the message. Context data such as message state or status value, status reason, and any other attribute of the message 130 or message object can be used to determine whether to look up a flow hook. Or, the application server 104 can specify context data in the call of operation 306, and that context data can be used to determine whether a flow hook lookup should occur.

If the context data results in a programmatic decision to conduct a flow hook lookup, then block 312 invokes flow service 114 with a request to find a current version of flow definition 116. The operation 316 inspects memory or persistent storage for a hook, link, reference, or pointer to a current version of a flow definition 116 and, if found, the flow definition is loaded.

At operation 318, the flow service 114 evaluates the flow definition based on the message 130 and all attribute values of the message or message object. As a result, the flow definition can cause one or more transformations of the message payload, message state or status value, or message channel. Specific kinds of transformations and operations are described herein in other sections. In various embodiments, an operation in the flow definition can be programmed for specifying a transformation of the message from a first payload value to a second payload value, specifying a transformation of the status value to a third state, specifying a transformation of the channel identifier to specify a different particular communication channel among the plurality of different communication channels, specifying a fetch of a plurality of data values from a specified network location, with FIG. 3 further comprising, in response to executing the fetch, storing the plurality of data values in a corresponding plurality of program variables in the main memory of the message application processor, or specifying an HTTP request to a specified network location. Or, the operation in the flow definition can specify a plurality of machine-executable instructions in a programming language capable of interpretation or in script code. Examples include PYTHON, LUA, RUBY, JAVASCRIPT, and PHP.

In some embodiments, flow service 114 can implement logging to track all message transformations, and operation 318 can be programmed to write a record to a log file specifying what transformations occurred at the operation. The flow service 114 can implement a log file query operation that the developer computer 102 can access to view the contents of message flow logs. Therefore, the developer computer 102 can see the transition of a message over time for analytical purposes including message campaign analysis, what conditions triggered which changes in state or status value and in what amount, and so forth.

At operation 320, flow service 114 returns a response. In some embodiments, operation 320 comprises returning a message object if the evaluation of the flow definition was successful, and an error object if the evaluation failed. Or, a response indicates success, failure, or a new payload, with a reference to the previous payload. Control then transfers back to operation 314 at which the response is received, and the publishing service 302 can return a commensurate response at operation 322 specifying whether the call of operation 306 succeeded or failed. Each response can include response codes or payloads with detailed explanations of the success or failure.

Core logic 304 can be viewed as executing asynchronously with respect to publishing service 302, flow service 114, and application server 104. Therefore, message state execution at block 308 and message state transition at block 309 can occur in a separate thread independent of the execution of the other blocks and process flows shown in FIG. 3. In this manner, messages can transition between the first state and the subsequent state as two states among a plurality of different possible states of a state machine that the message application processor implements to process the message. In some embodiments, the different possible states of a message are: created, scheduled, buffered, sent, delivered, delivery failure, and expired.

In some cases, message state execution at block 308 comprises the message application processor selecting, based on the channel identifier, a particular communication channel among a plurality of different communication channels, and transmitting a request to the particular communication channel to transmit the message using the particular communication channel. Such a request can occur in the first iteration of FIG. 3, or in subsequent iterations of blocks 308, 309, 310, 312, and so forth.

With the foregoing process, the developer computer 102, application server 104, and/or an enterprise or customer with which they are associated can access programmatic means to hook into and manipulate the states or status values of a message during processing by the message application processor 110, including causing the execution of any desired logic between the states, and to change the states.

2.3 Flow Example

In some embodiments, flow service 114 is programmed to implement a visual, graphical design application by which each flow definition 116 can be visually defined. FIG. 4 illustrates an example visual flow definition process, in one embodiment. The flow service 114 is used to create a flow definition using a plurality of steps 400, 401, 402, 430, each of which can be represented using a graphical icon in a visual workspace of a graphical user interface of a computer display device. Steps 400, 430 represent initiation and termination steps, respectively; step 401 is programmed to fetch one or more values from external APIs and to store the values in programmatic variables for use in the remainder of the flow; step 402 is programmed to generate an HTTP request to an external service, optionally using one or more of the values of the programmatic variables.

In one embodiment, step 401 is programmed to transmit network requests to a specified server or endpoint and to assign the response to variables within a memory domain of the flow service 114 for local use in processing other flow steps. The endpoint is expected to be associated with a networked server that responds to the request with a digital object that contains string values. Step 401 can be defined by visually specifying a network address of the target server; a method of access; and one or more variable names that match the keys of the JSON object of the response.

In one embodiment, the URL is an address of a website associated with the developer computer 102, application server 104, or an external HTTP endpoint. The URL is specified using either a hardcoded URL value starting with http:// or https:// or a variable. The method of access can be specified as GET, POST, PUT, DELETE, PATCH, or HEAD. In some embodiments, a request body can be specified, to be used with the "Set Content-Type header" field so that the receiver of the request can decode it correctly. In an embodiment, a header value specifies a dictionary of key-value pairs; the key is a header name and the value is the header value used for sending HTTP requests. In an embodiment, a variable name is specified for use in later steps. Each variable name must match the keys of a digital object in a response. For example, a JSON response from the server might contain the following:

```
{
"name": "Example user",
"zip_codes": ["31123", "31125"],
"billing": { "bank": "ABN AMRO" }
}
```

A flow definition that is compatible with such a response could define local variables to be maintained in memory by the flow service 114 as name, zip_codes[0], zip_codes[1] and billing.bank. After executing the fetch variables step, the variables would have the values "Example user", 31123, 31125, ABN AMRO, respectively.

Step 402 is programmed as an HTTP request step to make an HTTP request from the flow service 114 to a URL, for example, to send data without using any response in the flow. In an embodiment, step 402 can be added to the flow definition 116 by dragging an icon representing the step from a visual palette into a workspace and moving the icon near step 401, at which point an attachment arrow is added automatically. The flow service 114 can be programmed, in response to input from the developer computer 102 to select step 402, to generate and cause displaying a dialog box 404 that is programmed with GUI widgets to receive specified data values in specified formats, the data values collectively defining the step. In one embodiment, dialog box 404 comprises a Method widget 406 that is programmed as a pull-down menu and can specify an HTTP request method used for the request; selecting the pull-down menu enables the developer computer 102 to specify one of: GET, POST, PUT, DELETE, PATCH, HEAD.

An embodiment can interoperate with clients using standard HTTP request, retry, and exception processing. For purposes of illustrating a clear example, this section and FIG. 4 illustrate two kinds of steps for fetching variables and issuing HTTP requests. However, embodiments can implement many other kinds of steps, each of which can be selected and added to a flow definition in any desired sequence. For example, flows can impose execution limits and timeouts to force an advancement to the next state if specified flow logic is taking too long.

2.4 Practical Applications

The embodiments of this disclosure can be applied to many practical situations of data processing, communications, or interoperation with other systems. A flow can specify forwarding an SMS message to an email, causing creating and sending an email when an application receives a new SMS message. A flow can specify creating voice-based menus for an interactive voice response system. Abandoned cart engagement can be achieved by sending text messages to customers who left items in an online shopping cart. Automated responses in customer support SMS workflows can be defined.

As another example, engaging user experiences based on data can be created. The developer computer 102 can specify a trigger condition, such as an incoming message or a new order on the application server 104. The developer computer 102 can add steps to conduct language detection, route messages, and make relevant API calls. Different programmatic interactions across communication channels can define a specific customer path or experience. The developer computer 102 can design logic to route data and update application server 104 to reflect the latest updates from customer communications. Other embodiments can create more meaningful customer interactions on the platforms that customers know and use; for example, a flow can define how to complete sign-up forms via WhatsApp, exchange rich media on Messenger, enable orders via SMS, or schedule appointments on WeChat.

In other embodiments, flows can build data pipelines. Flows can empower a contact center with information from a CRM system, build pipelines for marketing campaigns, or centralize context from support software. Flows can move data between third party sources like Point of Sale Systems (POS), CRMs, fulfillment providers, order processing systems and more. Flows can connect data cross-functionally, by creating data pipelines across various sales, marketing, and support tools. Flows may be able to determine the preferred language and communication channel of customers, for updating to a customer profile.

It will be apparent that flow definitions 116 can specify many useful actions in response to specific message content, states, state values, or state transitions. For example, a flow definition 116 can implement content moderation. The flow definition 116 can be programmed to determine that a message 130 (FIG. 2) contains profanity, and in response, to change the value of the state 134 from the created state 200 immediately to the delivery failed state 210, without transitioning to the scheduled state 202 or buffered state 204.

Or, after creating the message 130, the application server 104 may need to generate a unique code to be attached to the message, such as a two-factor authentication code. In one embodiment, application server 104 can call a Post Messages function of the API 112, provide a customer ID associated with developer computer 102 or the application server, and cause generating a 4-digit or 6-digit code; the flow definition 116 also could inject arbitrary content into the message 130 to explain the code. In another example, a flow definition 116 could implement A/B testing in which the application server 104 requests a particular message 130, but the flow definition specifies, after the created state 200, to transform the message payload using one of two alternatives.

A flow definition 116 also can be programmed to implement templating and localization. The application server 104 could be programmed to output content for a message 130 in English, but a flow definition 116 could specify, after the created state 200 or scheduled state 202, to trigger a transformation of the text to Dutch or another language; after the flow concludes, a transition to the buffered state 204 could occur, causing sending the message in Dutch.

In a further example, the flow definition 116 is configured to cause the replaying of a message over another channel. For example, assume that the messaging channels 120, 122, 124 operate with servers, owners, or operators in different countries and impose different per-message rates based on location. The application server 104 could be programmed to use a first messaging channel 120 by default but, in response to detecting that the user computer 106 is located in a particular country, to switch to a different messaging channel 122 with a better cost structure. Or, the application server 104 could be programmed to send the message from an originator that is local to the user; for example, US end customers from California could receive a message from a local California number. A particular example could be switching from SMS to WHATSAPP because WHATSAPP offers better delivery rates in some countries. In this case, the flow definition could specify sending messages over WHATSAPP and switching to SMS in response to the delivery failed state 210 or another state associated with determining that the customer does not have a WHATSAPP number.

In yet another example, flow definition 116 could specify using a push notification or web sockets notification. For example, if application server 104 implements a mobile application and the user computer 106 is a mobile computing device, flow definition 116 could specify concurrently creating a message and transmitting it over a web socket channel, and calling back to the application server to request sending an in-app notification.

In all these examples, the disclosure provides the key benefit that the developer computer 102 and/or an owner or operator of the application server 104 does not need to implement their own messaging application, using SMS or any other channel. Instead, the message application processor 110 is programmed for interfacing and integrating with a plurality of different messaging channels, and the owner or operator merely needs to specify workflow operations across multiple channels using a flexible flow definition process. Without changing the application server 104 or the applications that it hosts, the owner or operator can operate a service that can switch channels among SMS, WHATSAPP, or others to change application behavior via state injection in the messaging flow.

In another example, the application server 104 can be programmed to detect personally identifying information (PII) and redact the PII from the message before processing it further.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508, or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display, a light-emitting diode (LED) display, a liquid crystal display (LCD), or an e-paper display. Computer system 500 may include other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on a display or other output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 514 may include a combination of multiple different input devices, such as a video camera and a depth sensor.

In another embodiment, computer system 500 may comprise an Internet of Things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as Internet 528. A server computer 530 may be coupled to Internet 528. Server computer 530 broadly represents any computer, data center, virtual machine, or virtual computing instance with or without a hypervisor or computer executing a containerized program system such as DOCKER or KUBERNETES. Server computer 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, a server farm, or other organization of computers that cooperate to perform tasks or execute applications or services. Server computer 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528, ISP 526, local network 522, and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    using a message application processor, receiving a first request from a separate application server computer executing a particular computer program application to create and cause sending a digital electronic message;
    in response to the first request, the message application processor creating the message and assigning a status value to the message, the status value being associated with a first state of the message;
    the message application processor causing the message to perform a transition to a subsequent state;
    the message application processor performing a flow hook lookup to determine whether a flow definition is associated with the transition from the first state to the subsequent state and with the particular computer program application, and in response thereto, evaluating the flow definition based on the message to result in executing an operation specified in the flow definition using one or more of a payload of the message, the status value, or a channel identifier of the message;
    the operation in the flow definition specifying a fetch of a plurality of data values from a specified network location, the computer implemented method further comprising, in response to executing the fetch, storing the plurality of data values in a corresponding plurality of program variables in a main memory of the message application processor;

the message application processor selecting, based on the channel identifier, a particular communication channel among a plurality of different communication channels, and transmitting a request to the particular communication channel to transmit the message using the particular communication channel.

2. The computer-implemented method of claim 1, the operation in the flow definition specifying a transformation of the message from a first payload value to a second payload value.

3. The computer-implemented method of claim 1, the operation in the flow definition specifying a transformation of the status value to a third state.

4. The computer-implemented method of claim 1, the operation in the flow definition specifying a transformation of the channel identifier to specify a different particular communication channel among the plurality of different communication channels.

5. The computer-implemented method of claim 1, the operation in the flow definition specifying an HTTP request to a specified network location.

6. The computer-implemented method of claim 1, the plurality of different communication channels comprising two or more of SMS, MMS; WHATSAPP; FACEBOOK MESSENGER; WEIXIN/WECHAT; QQ; TELEGRAM; SNAPCHAT; SLACK; SIGNAL; SKYPE; DISCORD; VIBER, APPLE BUSINESS CHAT, INSTAGRAM DIRECT, TIKTOK, EMAIL, ZALO, GOOGLE BUSINESS MESSAGING, LINE, TWITTER.

7. The computer-implemented method of claim 1, the first state and the subsequent state comprising two states among a plurality of different possible states of a state machine that the message application processor implements to process the message.

8. The computer-implemented method of claim 7, the plurality of different possible states comprising: created, scheduled, buffered, sent, delivered, delivery failure, expired.

9. The computer-implemented method of claim 7, the operation in the flow definition specifying a plurality of machine executable script code instructions.

10. One or more non-transitory computer-readable storage media storing one or more sequences of instructions which, when executed using one or more hardware processors of a message application processor cause the message application processor to perform:
receiving a first request from a separate application server computer executing a particular computer program application to create and cause sending a digital electronic message;
in response to the first request, creating the message and assigning a status value to the message, the status value being associated with a first state of the message;
causing the message to perform a transition to a subsequent state;
performing a flow hook lookup to determine whether a flow definition is associated with the transition from the first state to the subsequent state and with the particular computer program application, and in response thereto, evaluating the flow definition based on the message to result in executing an operation specified in the flow definition using one or more of a payload of the message, the status value, or a channel identifier of the message;
the operation in the flow definition specifying a fetch of a plurality of data values from a specified network location, the one or more non-transitory computer-readable storage media further comprising sequences of instructions which when executed by the message application processor cause, in response to executing the fetch, storing the plurality of data values in corresponding plurality of program variables in main memory of the message application processor;
selecting, based on the channel identifier, a particular communication channel among a plurality of different communication channels, and transmitting a request to the particular communication channel to transmit the message using the particular communication channel.

11. The one or more non-transitory computer-readable storage media of claim 10, the operation in the flow definition specifying a transformation of the message from a first payload value to a second payload value.

12. The one or more non-transitory computer-readable storage media of claim 10, the operation in the flow definition specifying a transformation of the status value to a third state.

13. The one or more non-transitory computer-readable storage media of claim 10, the operation in the flow definition specifying a transformation of the channel identifier to specify a different particular communication channel among the plurality of different communication channels.

14. The one or more non-transitory computer-readable storage media of claim 10, the operation in the flow definition specifying an HTTP request to a specified network location.

15. The one or more non-transitory computer-readable storage media of claim 10, the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER, APPLE BUSINESS CHAT, INSTAGRAM DIRECT, TIKTOK, EMAIL, ZALO, GOOGLE BUSINESS MESSAGING, LINE, TWITTER.

16. The one or more non-transitory computer-readable storage media of claim 10, the first state and the subsequent state comprising two states among a plurality of different possible states of a state machine that the message application processor implements to process the message.

17. The one or more non-transitory computer-readable storage media of claim 16, the plurality of different possible states comprising: created, scheduled, buffered, sent, delivered, delivery failure, expired.

18. The one or more non-transitory computer-readable storage media of claim 16, the operation in the flow definition specifying a plurality of machine executable script code instructions.

* * * * *